United States Patent [19]

Weggel

[11] Patent Number: 4,589,831

[45] Date of Patent: May 20, 1986

[54] REMOVABLE MOLD SEGMENTS FOR ROTARY MOLDS

[75] Inventor: Ralph W. Weggel, Hudson, Wis.

[73] Assignee: Berwind Corporation, Philadelphia, Pa.

[21] Appl. No.: 702,906

[22] Filed: Feb. 19, 1985

[51] Int. Cl.[4] .................................................. B29C 3/02

[52] U.S. Cl. .................................... 425/195; 425/237; 425/471

[58] Field of Search ................ 425/237, 470, 471, 195

[56] References Cited

U.S. PATENT DOCUMENTS

| | | | |
|---|---|---|---|
| 2,945,259 | 7/1960 | Decker et al. | 425/237 X |
| 2,958,902 | 11/1960 | Decker et al. | 425/237 X |
| 2,958,903 | 1/1960 | Decker | 425/237 X |
| 3,143,769 | 8/1964 | Komarek et al. | 425/237 |
| 3,829,267 | 8/1974 | Woodward | 425/237 |
| 3,907,485 | 9/1975 | Komarek | 425/470 |
| 3,907,486 | 9/1975 | Kennedy | 425/237 X |
| 4,097,215 | 6/1978 | Komarek | 425/237 X |
| 4,306,846 | 12/1981 | Komarek | 425/237 X |

*Primary Examiner*—J. Howard Flint, Jr.
*Attorney, Agent, or Firm*—McDougall, Hersh & Scott

[57] ABSTRACT

A rotary mold having a removable rotary mold segment of truncated sectorial shape having top, bottom, side, and end wall surfaces wherein the top arcuate surface is adapted for molding, and the generally planar bottom surface is connected to the top surface by two end walls in radial alignment with the axis of rotation defining the arcuate top surface wherein the bottom surface joining said end walls is in perpendicular alignment with one of said end walls.

22 Claims, 4 Drawing Figures

REMOVABLE MOLD SEGMENTS FOR ROTARY MOLDS

BACKGROUND OF THE INVENTION

The present invention relates to briquetting machines and, in particular, to briquetting rolls and removable segments therefore.

Briquetting machines are known devices which generally comprise a pair of wheel-like rolls geared together to cooperatively turn in opposing directions on parallel axes with the peripheral surfaces of each respective roll positioned in linear axial alignment with one another so that material introduced to the rolls is captured by the molding surfaces of the rolls and compressed into briquets by passage through the adjoining molding surfaces.

Briquetting apparatus and techniques have been used to compact and/or mold materials at both low temperatures and pressures as well as high temperatures and pressures for materials such as charcoal, iron ore, metal chips, etc. Generally, high pressure briquetting at elevated temperatures places additional demands upon the commonly employed rotary molds. In particular, rotary mold segments are subject to cracks from stress and to wear due to rocking and abrasion of the mold surface by the material to be molded.

It has been recognized that briquetting roll designs incorporating replaceable mold segments should permit easy removal and replacement of worn or broken segments with as little down time as possible. Also, inexpensive fabrication of durable segments which may be firmly secured in proper alignment are long known goals of segment design. The use of rolls comprised in part of a plurality of replaceable mold segments having surface cavities capable of receiving material to be briquetted is described in many prior art patents including U.S. Pat. Nos. 3,907,485; 4,306,846; and 4,097,215.

U.S. Pat. No. 3,907,485 describes replaceable mold segments adapted for placement upon the periphery of a cylindrical central member. These mold segments are affixed to the cylindrical central member by fasteners engaging projections extending outwardly from the side walls of the mold segment. This configuration of the mold segment cooperates with the central member such that radial compression forces applied to the mold segment are transmitted through the bottom surface of the mold segment, which bottom surface is coplanar with the projections from the side walls. The application of such forces to the mold segments produces bending stresses in the mold segment that can result in premature failure due to cracking of the strong part brittle mold segment.

U.S. Pat. No. 4,306,846 describes the use of a symmetrically shaped replaceable mold segment for a briquetting roll. These segments have side walls including upper and lower portions, the upper portions of which are disposed at an angle convergent with respect to a top working surface, and the lower portions of said side walls are divergent with respect to the axis of rotation of the rolls.

U.S. Pat. No. 4,097,215 describes a briquetting press roll which comprises a cylindrical core having a regular polygonal cross-section and a plurality of equal planar sections around its peripheral surface to which are attached a plurality of removable mold segments each having a flat bottom surface with said segments being attached by retaining rings.

Thus, prior art processes, techniques, and apparatus have been employed with varying degrees of success to alleviate the foregoing problems relating to premature failure or wear of roll segments. Some prior art devices go to great lengths to overcome these wear and cracking problems. For example, U.S. Pat. No. 2,958,902 describes the use of exchangeable segments which when attached to a briquetting roll are aligned so that the separation gap between segments forms an acute angle with cylinder generatrices which are parallel to the roller axis. The foregoing arrangement purportedly reduces wear by reduction of non-uniform forces due to overlapping separation gaps (Col. 1, lines 25–67). This device has the disadvantage of high machining costs due to it complicated design as best illustrated FIGS. 2, 3, 11 and 14.

As mentioned above, prior art segments suffer from wear due to rocking of the segment in its seat. This movement of a segment with respect to its seat occurs as a force travels across the arcuate molding surface of the segment causing the segment to pivot due to aberrations in surface contact. Since this rocking movement causes undesirable wear, attempts are made to minimize rocking in order to prolong segment life. One way to minimize rocking is to reduce the surface aberrations which act as "pivot points" for rocking. Machining of contact surfaces between segment and core seat will reduce rocking. Advantageously, the present invention reduces machining time and costs by allowing machining of flat surfaces which include at least one right angle between two flat planar surfaces. Use of a right angle allows utilization of uncomplicated fixtures in the machining process. Simplification of machining is especially desired to lower the time and cost of such operations in those countries having high labor costs.

SUMMARY OF THE INVENTION

It is an object of the present invention to provide replaceable mold segments having improved durability.

A further object of this invention is to provide segments resistant to wear, especially wear caused by rocking.

A further object of the present invention is to provide segments which are easy and economical to machine.

A further object of the invention is to provide a design which reduces machining costs while maintaining or improving durability and wear-resistance.

A further object of this invention is to provide a briquetting roll with easy-to-replace mold segments of economical design.

A further object of this invention is to provide a keyless segment/core combination which resists wear and breakage from rotational forces through a sawtooth core design.

The foregoing objects and others which will become apparent from that which follows are achieved in a rotary mold segment which comprises a top arcuate molding surface, a bottom surface, two opposing end walls connecting this top surface and this bottom surface whereby said segment further having a connection between one end wall with the bottom surface which defines an angle of from about 80 to 90 degrees, and further comprising two opposing side walls connecting the respective sides of the top, bottom and end walls.

A preferred embodiment comprises a rotary mold segment of truncated sectorial shape (hereinafter "right angle preferred embodiment") which segment comprises a top arcuate molding surface, a bottom surface, two opposing end walls connecting the top surface and this bottom surface whereby said connections define a right angle with respect to a line drawn tangent to the arcuate top surface at each respective connecting end, and said segment further having a connection between one end wall with the bottom surface which defines a right angle, and further comprising two opposing side walls connecting the respective sides of the top, bottom and end walls.

By the term "a line drawn tangent to the arcuate surface at each respective connecting end" is meant the tangent line at that end point presuming a continuation of preceding arcuate curve. It is not necessary that each and every object listed above be found in all embodiments of the invention. It is sufficient that the invention may be advantageously employed when compared to the prior art.

The present invention also comprises a rotary mold having a roll shaft with a core portion adapted to receive the plurality of removable mold segments and fastening means for removably attaching mold segments to said core and a plurality of the above-described mold segments. Fundamental to the instant invention is the design of a replaceable mold segment having an angle from about 80 to 90 degrees between the generally planar bottom surface and the longer end wall of said segment.

Each mold segment comprises a body having a bottom planar surface which mates with a corresponding surface on the sawtooth-shaped core portion of a roll shaft. In the preferred embodiment, the bottom right angular surface formed by one end wall with the bottom portion of the segment mates with the corresponding right angular L-shaped peripheral portion of the core surfaces.

DETAILED DESCRIPTION OF THE INVENTION

Figure 1:
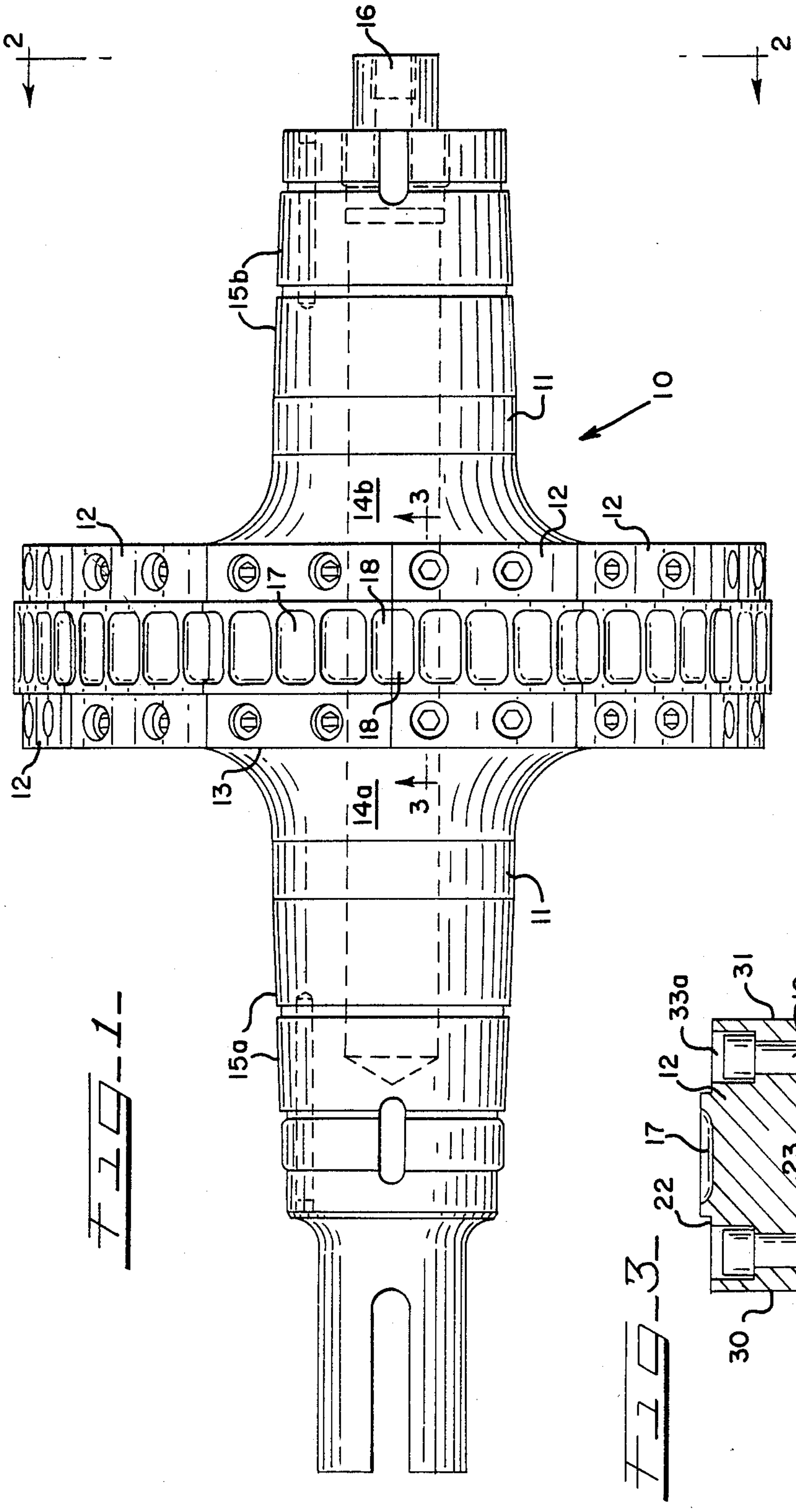
FIG. 1 is a plan view of a roll shaft and segment construction characterized by the features of this invention.

Reterring to FIG. 1, a rotary mold 10 suitable for use with a second similar rotary mold according to known techniques in a briquetting machine (not shown) is depicted. The rotary mold 10 comprises a roll shaft 11 adapted for rotation within a briquetting machine in coaxial alignment with a similar roll shaft, both of which shafts possessing a plurality of mold segments 12 positioned about the periphery of a roll core 13 which is integral with said shaft 11. Also integral with said roll core is roll radius 14*a* and roll core radius 14*b*. Shaft 11 also contains bearing cone surfaces 15*a* and 15*b* positioned on either side of said roll core 13. Roll shaft 11 may be equipped with access means 16 for temperature control.

Each rotary mold segment 12 contains three complete mold cavities 17 and two separate cavity halves 18, at either end of each segment 12. Each segment member is adapted to cooperate with a segment member adjacent thereto in forming a complete mold cavity in the assembled roll. Thus, each segment member in FIG. 1 has three complete mold cavities formed in the center and has half pockets formed thereon at the ends.

The present invention contemplates the use of differing numbers of mold cavities and designs, e.g. more than one row of mold cavities could be provided, or blank segments without molds or segments having different or varying shapes. Mold cavities may be either completely contained within each segment or not according to design needs. Advantageously, a roll comprising a plurality of segments made according to the present invention may contain 12 to 16 segments. The use of 12 segments provides a reduction in the number of machining operations and allows stronger fastening of segments to the roll core, while the use of 16 segments allows reduced costs with respect to modifying present roll cores and for production of segments from readily available stock materials. Of course, fewer than 12 or greater than 16 segments may also be employed, depending upon roll size. Rolls of any diameter are contemplated.

Figure 2:
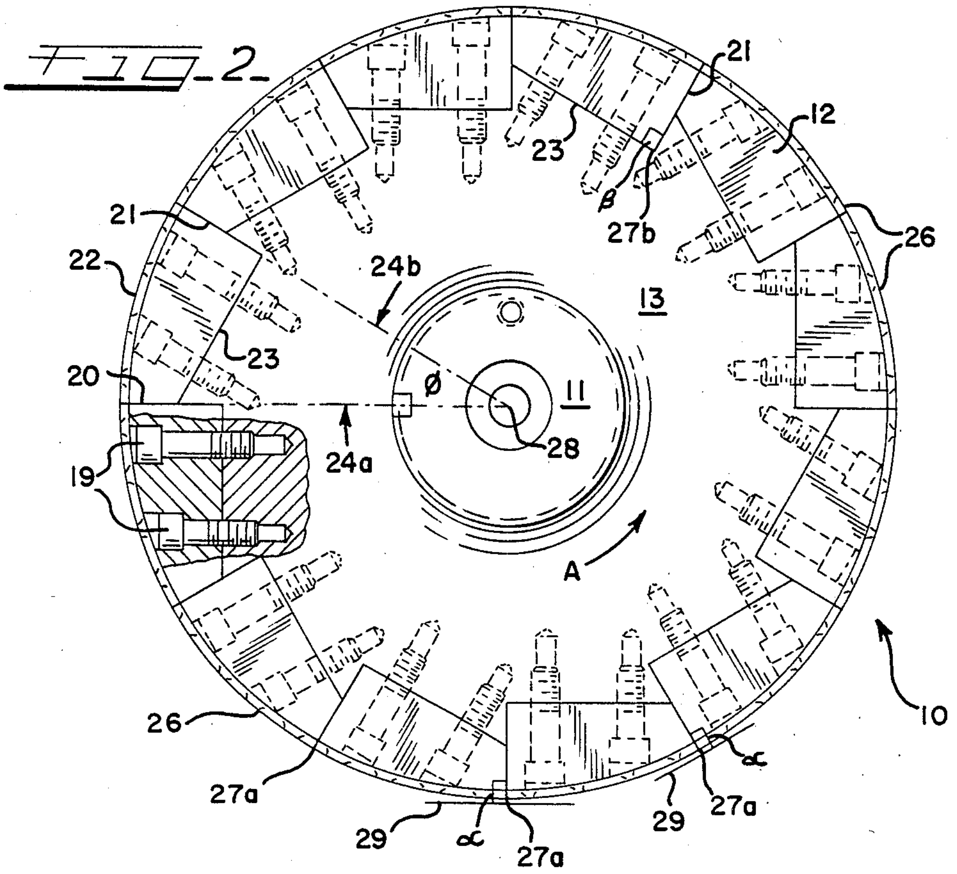
FIG. 2 is an end elevation of the roll shaft taken about the line 2—2 of FIG. 1 with a partial broken away area showing screw placement.

Referring now to FIG. 2, an end elevational view of rotary mold 10 including roll shaft 11 taken about line 2—2 of FIG. 1 is depicted. Roll shaft 11 supports roll core 13 about which are attached twelve roll mold segments 12 which are removably attached by fastening means such as sunken screws 19 treated with a suitable lubricant such as a solid film molybedenum disulfide lubricant known as Molykote (not shown).

Each segment 12 comprises two end walls 20 and 21 connecting a top arcuate working surface 22 with a bottom surface 23. In the right angle preferred embodiment, each end wall 20 and 21 is coplanar with axially disposed planes 24*a* and 24*b* which extend from the axis of rotation 25 to rotary mold perimeter 26. Thus the angle $\phi$ between said planes 24*a* and 24*b* which may define the location of said end walls 20 and 21 is approximately 30 degrees for a twelve-segmented rotary mold. Of course, angle $\phi$ may vary to accommodate a greater or fewer number of segments. By use of the term approximate is meant an angle sufficient to create the segment size desired for the particular roll core.

The skilled artisan upon reading this disclosure will understand that the precise angle will vary, not only upon the number of segments to be employed in forming peripheral arcuate surface 26, but also upon such application dependent variables as: the desired degree of machining of end walls 20 and 21; necessary tolerances between segments to allow the desired degree of ease of attachment and removal; space necessary for thermal expansion and/or constriction (operating temperatures may vary depending upon other design variables), etc.

By remachining is meant the process whereby working surface 22 may be machined to re-obtain a sharp mold cavity periphery thereby extending the useful life of the segment 12. Remachining will remove aberrations in the working surface 22 of segments 12 and thereby reduce the diameter of the rotary mold. Some excess material may be left on the segment working surface initially (before first use) to allow for remachining after wear from operation.

Generally, the segments wil be constructed of a wear-resistant metal such as steel. The particular material used to construct the segments 12 will depend primarily upon the intended applications for the particular rotary mold. Generally, steels and irons having application-dependent compositions will be employed.

End walls 20 and 21 may also be defined for the right angle preferred embodiment by reference to imaginary lines drawn tangent to the top arcuate surface 22 at each point 27*a* connecting top surface 22 to either end wall 20 and 21. Two such tangent lines 28 and 29 form right angles α with each respective end wall 20, 21. Thus, the connections 27*a* between each end wall 20, 21 with the top arcuate surface 22 defines a right angle with respect to a line 28 drawn tangent to the arcuate top surface 22 at each respective end 20, 21.

Furthermore, for all embodiments, segment 12 may be defined by a ratio of the length of the longer end wall 21 to the length of the shorter end wall 20 and the angle between the longer end wall 21 and the bottom surface 23. A suitable range of such end length ratios is 22:16 to 17:6; with a preferred range being 18:11 to 16:9. As further depicted in FIG. 2, the connection 27*b* between end wall 21 and bottom surface 23 forms an angle β. A suitable range for β would be from about 80 to about 90 degrees. It is believed that when β is 90 degrees or less, then tipping or rotational action about the corner forming the angle is reduced.

Advantageously, when β is a right angle, this facilitates machining of segment surfaces thereby reducing machining costs. Roll core 13 and attached segments 12 will rotate during normal operation in the direction shown by arrow A. Advantageously, the indicated direction of rotation in combination with the design of the segments 12 and segment attachment to the roll core 13 is believed to reduce wear due to rocking. Also, the novel segment is adapted to withstand rotational forces presented as the roll moves from the shorter segment end to the longer segment ends.

The sawtooth design of the perimeter of roll core 13 resists rotational forces exerted against the segments 12 relative to core 13. The torque produced during acceleration, deceleration and use of the rotary mold operates to cause the segments to slip relative to the core perimeter. In the present invention, this "slippage" is counteracted by the sawtooth design which, when the mold is rotated as indicated, is believed to decrease wear while providing a substantially flat bottom surface without necessitating the use of keys or other core and-/or segment weakening grooves.

The mating roll which runs adjacent to the roll depicted will be adapted to rotate in a clockwise direction since roll 11 is shown rotating in a counterclockwise direction. However, it should be understood that both rolls will rotate in the direction shown by arrow A with respect to the positioning of the segments, i.e., while both rolls will turn in opposite direction on parallel axes, nonetheless, the segments on each roll will be positioned so that as each separate segment passes a chosen point during rotation, the shorter end surface of the segment will pass that point first. Reversal of the direction of rotation depicted will normally occur only after unloading in order to remove a jam or plug and then only for a short time.

Figure 3:
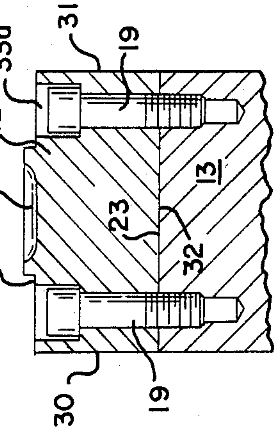
FIG. 3 is a sectional view taken about the line 3—3 of FIG. 1.

Referring now to FIG. 3, rotary mold segment 12 and roll core 13 are shown in a sectional view taken about the line 3—3 of FIG. 1. Segment 12 has a top surface 22 (with raised mold cavity 17) connected to bottom surface 23 by side walls 30 and 31. Segment 12 is attached to planar core surface 32 in substantial coplanar alignment by a plurality of threaded screws 19, which are recessed below surface 22 and removably secured to core 13 through a plurality of holes 33*a* adapted to removably receive, align, and secure together segment 12 with core 13. Advantageously, at least a portion of the holes 33*a* which extend into core 13 are threaded for connection with screws 19. Alternative attachment means for removably fastening segments to a roll, which means are well known in the art, such as clamp rings, may also be employed.

Figure 4:
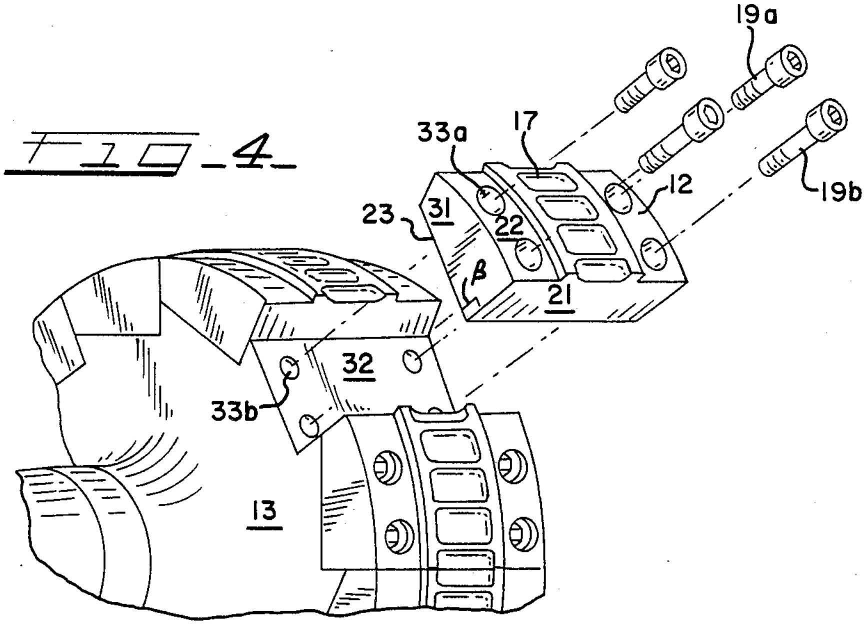
FIG. 4 is an exploded fragmentary perspective view depicting fastening of individual segments to the roll core of FIG. 1.

Referring now to FIG. 4, an exploded fragmentary perspective view depicting attachment of a segment 12 having a top surface 22 with raised mold cavity 17, side wall 31 and end wall 21 connected so that wall 21 forms an angle β with bottom surface 23. Four holes 33*a* extend from top surface 22 through an otherwise solid segment body 12 through bottom surface 23. These holes 33*a* align with threaded holes 33*b* in roll core surface 32. Holes 33*b* extend a sufficient distance below surface 32 to provide adequate securing of segment 12 to core 13 when segment 12 is secured to core 13 by threaded screws 19*a* and 19*b*. Screws 19*a* which secure segment 12 through a lesser segment thickness (such as that nearer side 20) and screws 19*b* (which are located nearer longer segment side 21) may be or lesser and greater length, respectively, to avoid weakening of the core roll by intersection of holes 33*b* between adjacent core surfaces 32.

It will be understood that various changes and modifications may be made in the segment and mold described (which provide the characteristics of the invention) without departing from the spirit thereof particularly as defined in the following claims.

What is claimed is:

1. A rotary mold segment of truncated sectorial shape comprising: a top arcuate molding surface; a bottom surface; two opposing end walls connecting said top surface and said bottom surface wherein (a) said connections between each said end wall with said top surface defines a right angle with respect to a line drawn tangent to said arcuate top surface at each respective end of said top arcuate surface and (b) one of said connections between each said end wall with said bottom surface defines a right angle; and two opposing side walls connecting the respective sides of said top, bottom, and end wall sides.

2. A rotary mold segment as defined in claim 1 wherein said bottom surface is substantially planar.

3. A rotary mold segment as defined in claim 1 further comprising attachment means for connecting said segment to a roll core.

4. A rotary mold segment as defined in claim 3 wherein said attachment means are adapted for removable attachment.

5. A rotary mold segment as defined in claim 4 wherein said attachment means comprise a plurality of threaded holes extending from said top arcuate surface to said bottom surface.

6. A rotary mold segment as defined in claim 1 wherein said side walls are perpendicular to said top, bottom and end wall surfaces of said segment.

7. A rotary mold segment as defined in claim 1 wherein said top arcuate molding surface contains a plurality of mold cavities.

8. A rotary mold segment as defined in claim 1 wherein said end walls are substantially planar.

9. A rotary mold comprising: a roll shaft having a core portion adapted to receive a plurality of removable mold segments; fastening means for removably attaching mold segments to said core; and a plurality of mold segments, each of said segments comprising: a top arcuate molding surface; a bottom surface; two opposing end walls connecting said top surface and said bottom surface wherein (a) said connections between each said end wall with said top surface defines a right angle with respect to a line drawn tangent to said arcuate top surface at each respective end of said top arcuate surface and (b) one of said connections between each said end wall with said bottom surface defines a right angle; and two opposing side walls connecting the respective sides of said top, bottom, and end wall sides.

10. A rotary mold as defined in claim 8 wherein said bottom surface of said segment is substantially planar.

11. A rotary mold as defined in claim 8 wherein said plurality of mold segments comprise from 12 to 16 segments.

12. A rotary mold as defined in claim 8 wherein said end walls of said segments are substantially planar.

13. A rotary mold as defined in claim 10 wherein said end walls are substantially planar.

14. A rotary mold as defined in claim 13 wherein said side walls are perpendicular to said top, bottom, and end wall surfaces of said segment.

15. A rotary mold as defined in claim 9 wherein said segment and said core portion adapted to receive segments are keyless.

16. A rotary mold as defined in claim 9 wherein said core has a sawtooth perimeter adapted to receive a plurality of segments.

17. A rotary mold as defined in claim 16 wherein said sawtooth design of said core perimeter is further adapted to resist rotational forces exerted against said segments relative to said mold core.

18. A rotary mold segment comprising a top arcuate molding surface; a bottom surface; two opposing end walls connecting said top surface and said bottom surface wherein (a) one of said end walls from top to bottom has a greater distance than the other and (b) said connection between said longer end wall with said bottom surface defines an angle of between about 80 to 90 degrees; and two opposing side walls connecting the respective sides of said top, bottom and end wall sides.

19. A rotary mold segment as defined in claim 16 which is keyless.

20. A rotary mold segment as defined in claim 18 wherein said bottom surface of said segment is substantially planar.

21. A rotary mold segment as defined in claim 18 wherein a ratio of the length of said longer end wall to the length of the shorter end wall is from about 22:16 to 17:6.

22. A rotary mold segment as defined in claim 18 wherein a ratio of the length of said longer end wall to the length of the shorter end wall is from about 18:11 to 16:7.

* * * * *